(12) United States Patent
Huber et al.

(10) Patent No.: US 7,746,477 B1
(45) Date of Patent: Jun. 29, 2010

(54) SYSTEM AND METHOD FOR ILLUMINATING AND IMAGING A SURFACE FOR AN OPTICAL NAVIGATION SYSTEM

(75) Inventors: Edward D. Huber, Portola Valley, CA (US); Brett A. Spurlock, Los Altos, CA (US); Jahja I. Trisnadi, Cupertino, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 195 days.

(21) Appl. No.: 11/361,429

(22) Filed: Feb. 24, 2006

(51) Int. Cl.
*G01B 9/02* (2006.01)
(52) U.S. Cl. ........................................ 356/498; 345/166
(58) Field of Classification Search ................. 356/482, 356/498–516, 520
See application file for complete search history.

(56) References Cited

U.S. PATENT DOCUMENTS

| | | | |
|---|---|---|---|
| 5,692,083 A | 11/1997 | Bennett | |
| 6,226,092 B1 * | 5/2001 | de Lega | 356/512 |
| 6,327,038 B1 * | 12/2001 | Maxey | 356/508 |
| 6,452,726 B1 * | 9/2002 | Mandella | 359/641 |
| 7,161,682 B2 * | 1/2007 | Xie et al. | 356/520 |
| 2004/0227954 A1 * | 11/2004 | Xie | 356/498 |
| 2005/0024336 A1 * | 2/2005 | Xie et al. | 345/166 |

OTHER PUBLICATIONS

J.W. Goodman, "Statistical Properties of Laser Speckle Patterns," in "Laser Speckle and Related Phenomena," edited by J.C. Dainty, Topics in Applied Physics, vol. 9, Springer-Verlag, 1984, pp. 39-40; 2 pages.

\* cited by examiner

*Primary Examiner*—Hwa S. Andrew Lee

(57) ABSTRACT

The present invention discloses an optic system for providing illumination and imaging functions in an optical navigation system. Generally, the optic system includes a unitary optic component having an illumination lens and at least one prism to project a collimated beam of light from a light source in the optical navigation system onto a surface, and an imaging lens to image at least a portion of the illuminated surface to an array of photosensitive elements. In one embodiment, optic system further includes an aperture component having a precision aperture, the aperture component configured to locate the precision aperture between the imaging lens of the unitary optic component and the array of photosensitive elements in a path of light reflected from the portion of the illuminated surface to the array of photosensitive elements. Other embodiments are also described.

10 Claims, 6 Drawing Sheets

SYSTEM AND METHOD FOR ILLUMINATING AND IMAGING A SURFACE FOR AN OPTICAL NAVIGATION SYSTEM

TECHNICAL FIELD

The present invention relates generally to optical navigation systems and methods of sensing movement using the same.

BACKGROUND OF THE INVENTION

Data input devices or finger navigation devices, such as computer mice, touch screens, trackballs, scroll wheels and the like, are well known for inputting data into and interfacing with personal computers or workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

Computer mice, for example, come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, etc. In particular, mechanical mice have not demonstrated the accuracy demanded in state-of-the-art mice today, which generally must have a path error of less than 0.5%. In addition, the movement and resultant wear of the mechanical elements, particularly the shaft encoders, necessarily limit the useful life of the device.

One solution to the above problems with mechanical mice has been the development of mice using an optical navigation system. These optical mice have become very popular because they provide a better pointing accuracy and are less susceptible to malfunction due to accumulation of dirt.

The dominant technology used today for optical mice relies on a light emitting diode (LED) illuminating a surface at or near grazing incidence, a two-dimensional CMOS (complimentary metal-oxide-semiconductor) detector which captures the resultant images, and software that correlates successive images to determine the direction, distance and speed the mouse has been moved. This technology provides high accuracy but suffers from a complex design and relatively high image processing requirements.

Another approach uses one-dimensional arrays of photosensors or detectors, such as photodiodes (PDs), and a narrowband or coherent light source, such as a Vertical Cavity Surface Emitting Laser (VCSEL). Light from the light source scattered off of an optically rough surface generates a random intensity distribution of light known as speckle. Successive images of the surface are captured by imaging optics, translated onto the photodiodes, and compared to detect movement of the mouse. The photodiodes may be directly wired in groups to facilitate motion detection. This reduces the photodiode requirements, and enables rapid analog processing. The use of a speckle-based pattern has several advantages, including efficient laser-based light generation and high contrast images even under illumination at normal incidence. This allows for a more efficient system and conserves current consumption, which is very important in wireless applications.

Although a significant improvement over prior mechanical mice, these optical navigation system based devices have not been wholly satisfactory for a number of reasons. In particular, VCSELs and PD arrays are typically formed on a substrate or wafer, using semiconductor fabrication or processing techniques. Individual devices, commonly referred to as a chip or die, are then packaged as separate integrated circuits (ICs), which may or may not then be attached or mounted to a common printed circuit board (PCB). Conventional optical navigation systems use external illumination and imaging optics that are not mounted to the IC package or PCB to illuminate a portion of the surface with light from the light source, and to map or image a pattern of the surface to the optical sensor.

One problem encountered with conventional, external optics, is that part they greatly increase the size or footprint of the optical navigation system. Another problem is that the alignment requirements of the optical elements of the illumination and imaging optics to the VCSEL or light source and the PD arrays can be critical to adequate performance of the system. It will further be appreciated that this alignment requirement can greatly impact overall costs and yield of the finished product.

Accordingly, there is a need for an optical navigation system that includes illumination and imaging optics for use in an optical data input devices or finger navigation devices that reduces the overall size and complexity of the system while enhancing system stability and reliability, and substantially reducing costs and increasing yield of the finished device.

The present invention provides a solution to these and other problems, and offers further advantages over conventional optical navigation systems.

BRIEF DESCRIPTION OF THE DRAWINGS

These and various other features and advantages of the present invention will be apparent upon reading of the following detailed description in conjunction with the accompanying drawings and the appended claims provided below, where:

DETAILED DESCRIPTION

The present invention relates generally to optical navigation systems having optical sensors for sensing relative lateral movement between the sensor and a surface on or over which it is moved. Optical navigation systems can include or are used in, for example, an optical computer mouse, trackballs and the like, and are well known for inputting data into and interfacing with personal computers and workstations. More particularly, the invention is directed to a monolithic or unitary optic system for providing illumination and imaging functions in an optical navigation system.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

Optical Navigation Systems

Figure 1:
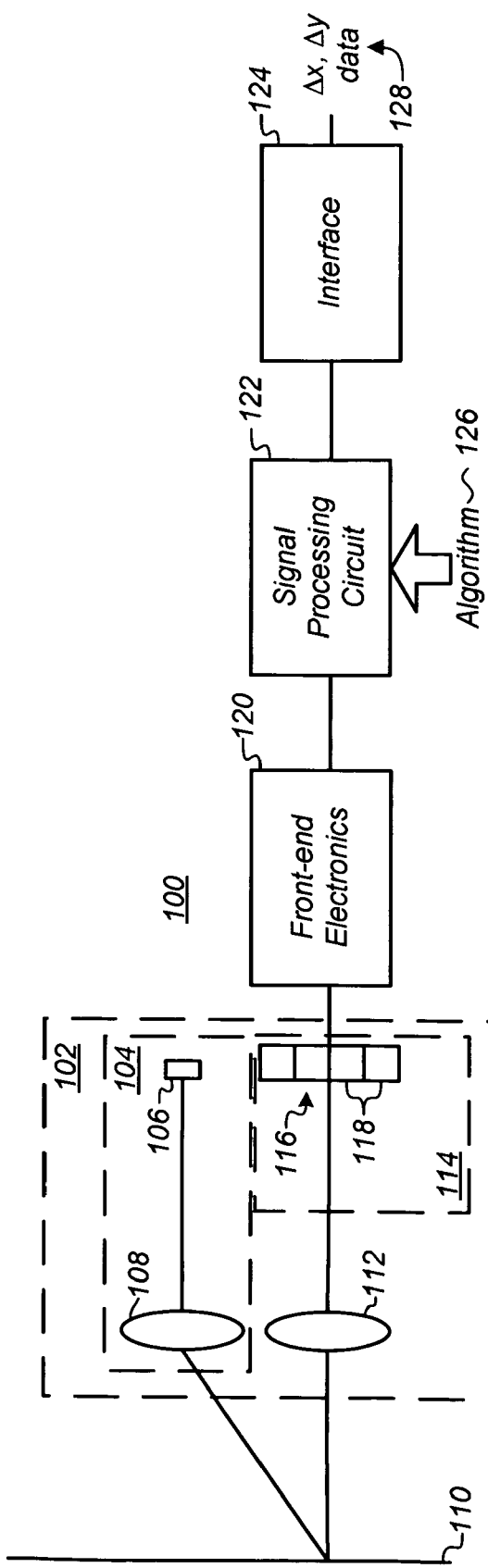
FIG. 1 is a functional block diagram of an optical navigation system according to an embodiment of the present invention.

A functional block diagram of one embodiment of an optical navigation system for which a monolithic or unitary optic system of the present invention is particularly useful is shown in FIG. 1. Referring to FIG. 1, an optical navigation system 100 generally includes an optical head 102 having an illuminator 104 with a light source 106 and illumination optics 108 to illuminate a portion of a surface 110, imaging optics 112 to map or image a pattern of the surface created by scattering of the light thereon, and an optical sensor 114 to sense or detect change in the pattern. The optical sensor 114 includes one or more one-dimensional (1D) or two-dimensional (2D) arrays 116 each having a number of photosensitive elements, such as photodiodes 118, on which light reflected from the surface 110 is received. The array(s) 116 may be configured to provide displacement measurements along two orthogonal axes, x and y. The optical navigation system 100 further includes front-end electrics 120, signal processing circuitry 122, and interface circuitry 124. Groups of photodiodes 118 in the array(s) 116 may be combined using passive electronic components in the front-end electrics 120 to produce group signals. These group signals may subsequently algebraically combined by the signal processing circuitry 122 using an algorithm 126 to produce to produce a signal providing information on the magnitude and direction of displacement of the sensor 114 in x and y directions. The signal may be converted by the interface circuitry 124 to produce Δx, Δy data 128 which may be output by the system 100.

In accordance with the present invention, the illumination and imaging optics are formed within a single, monolithic or unitary optic system or Molded Optic System (MOS). Generally, the MOS includes a unitary optic component or Molded Optic Component (MOC) having an illumination lens and at least one prism surface to project a collimated beam of light from a light source in the optical navigation system onto a surface, and an imaging lens to image at least a portion of the illuminated surface to an array of photosensitive elements. In one embodiment, the MOS further includes aperture component or Molded Aperture Component (MAC) having a light baffle with a precision aperture therein, the precision aperture located between the imaging lens and the array of photosensitive elements in a path of light reflected from the portion of the illuminated surface to the array of photosensitive elements.

Preferably, the optical navigation system includes a coherent or narrow band light source, such as a Vertical Cavity Surface Emitting Laser (VCSEL), and a speckle based optical sensor.

Figure 2:
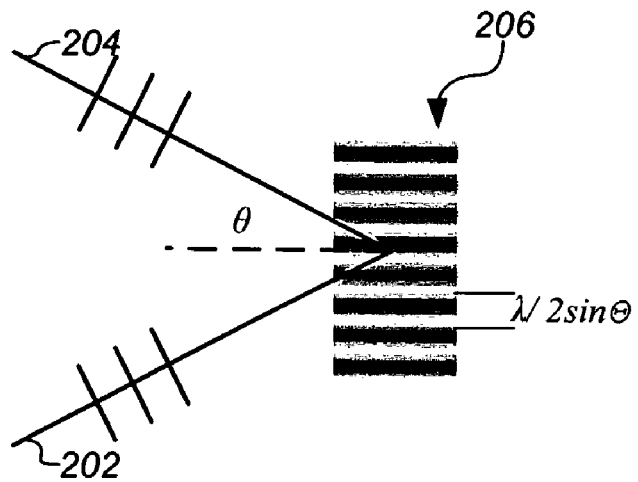
FIG. 2 illustrates an interference pattern formed by two coherent beams of light.

Operating principles of speckle-based optical sensors will now be described with reference to FIGS. 2 and 3. Referring to FIG. 2, laser light of a wavelength indicated is depicted as a first incident wave 202 and a second incident wave 204 to a surface, each making an angle of incidence θ with respect to the surface normal, resulting in an interference pattern 206 that has a periodicity of λ/2 sin θ.

Figure 3:
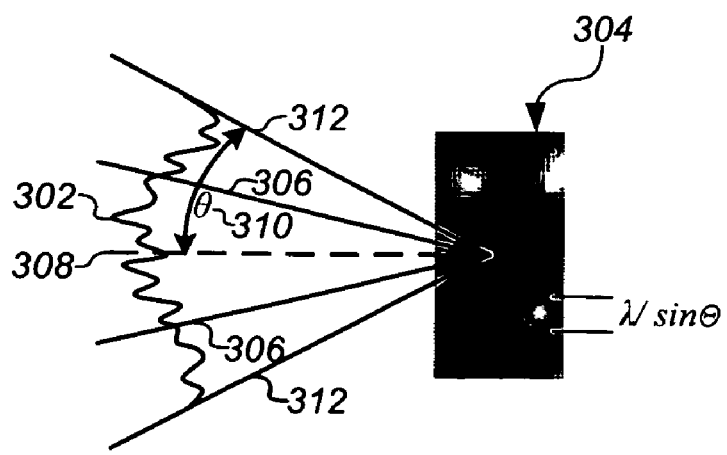
FIG. 3 illustrates a speckle in an interference pattern of light reflected from a rough surface.

In contrast, referring to FIG. 3, any general surface with morphological irregularities of dimensions greater than the wavelength of the incident light (i.e. roughly >1 μm) will tend to scatter light 302 into a complete hemisphere in approximately a Lambertian fashion. If a coherent light source, such as a laser is used, the spatially coherent, scattered light will create a complex interference pattern 304 upon detection by a square-law detector with finite aperture. This complex interference pattern 304 of light and dark areas is termed speckle. As shown in FIG. 3, the contribution for the measured speckle pattern 304 comes from rays 206 between the surface normal 308 and the extreme rays 312. Speckle is essentially the random interference pattern generated by scattering of coherent light off of a rough surface and detected by an intensity photosensitive element, such as a photodiode, with a finite angular field-of-view or numerical aperture (NA). The detailed nature of the speckle pattern depends on the surface topography, the wavelength of light, and the imaging optics of the sensor. Although often highly complex, a speckle pattern is distinctly characteristic of a section of any rough surface that is imaged by the optics and, as such, can be employed to identify a location on the surface as it is displaced transversely to the laser and optics-sensor assembly.

Speckle is expected to come in all sizes up to the spatial frequency set by the effective aperture of the optics, conventionally defined in term of its numerical aperture NA=sin θ as shown FIG. 3. Following Goodman [J. W. Goodman, "Statistical Properties of Laser Speckle Patterns" in "Laser Speckle and Related Phenomena" edited by J. C. Dainty, Topics in Applied Physics volume 9, Springer-Verlag (1984)—in particular, see page 39-40.], the size statistical distribution is expressed in terms of the speckle intensity auto-correlation. The "average" speckle diameter is defined as:

$$a = \frac{\lambda}{\sin\theta} = \frac{\lambda}{NA} \quad (1.0)$$

where λ is the wavelength of the coherent light, NA is the numerical aperture of the photosensitive element, and θ is the angle (θ 310) between normal 308 and one of the extreme rays 312.

One advantage of a laser speckle-based optical sensor is that it can operate with illumination light that arrives at near-normal incidence angles. Sensors that employ imaging optics and incoherent light arriving at grazing incident angles to a rough surface also can be employed for transverse displacement sensing. But, since the grazing incidence angle of the illumination is desired to create appropriately large bright-dark shadows of the surface terrain in the image, the system is inherently optically inefficient, as a significant fraction of the light is reflected off in a specular manner away from the sensor and thus contributes nothing to the image formed. In contrast, a speckle-based sensor can make efficient use of a larger fraction of the illumination light from the laser source, thereby enabling the development of an optically efficient displacement sensor.

In a preferred embodiment the optical sensor includes a 2D comb-array having multiple detectors or photosensitive elements are arrayed in two dimensions.

Figure 4:
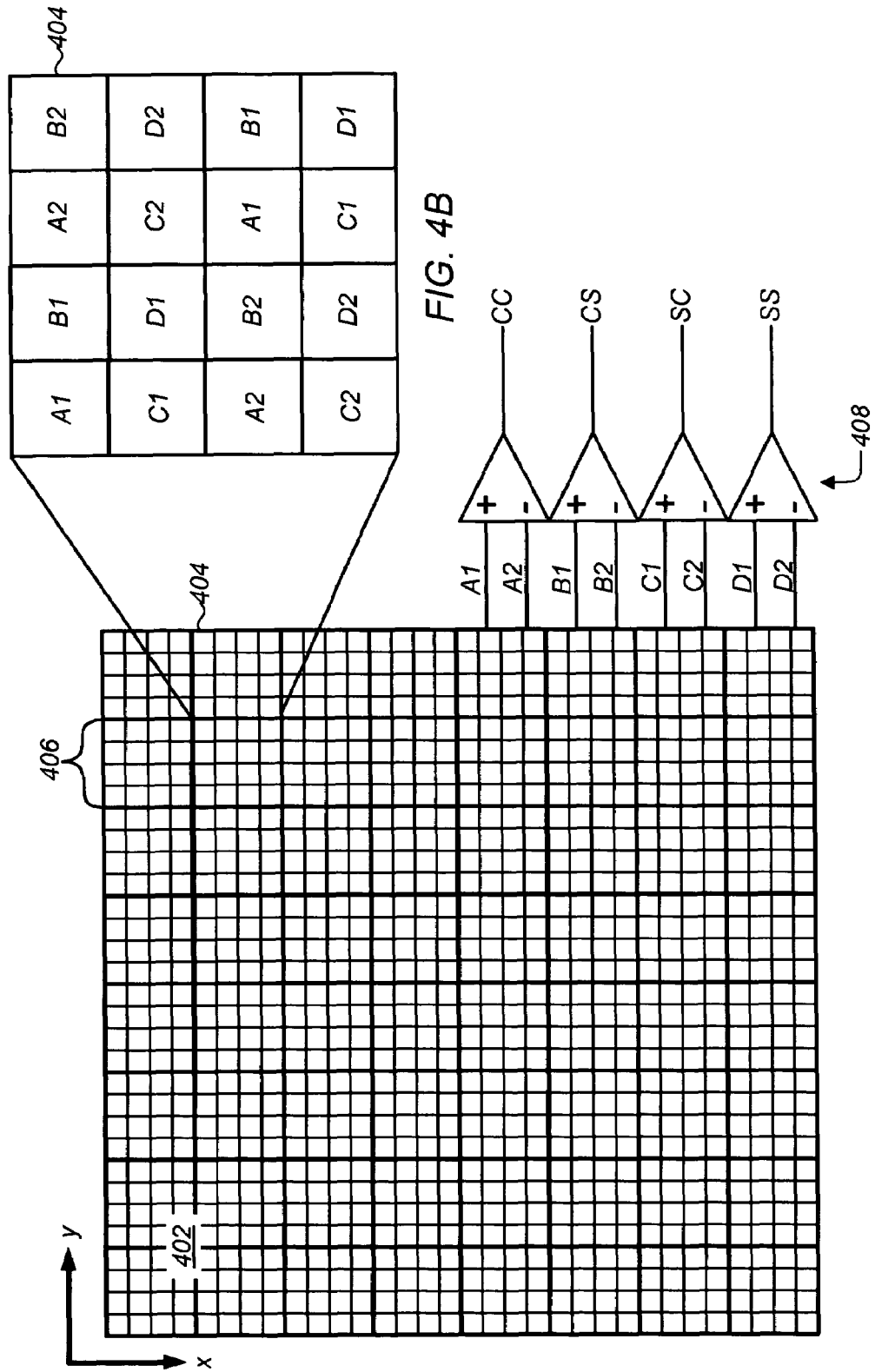
FIGS. 4A and 4B are schematic block diagrams of a 2D comb-array having photosensitive elements grouped in a 4×4 elements-per-cell configuration according to an embodiment of the present invention.

In the embodiment shown in FIGS. 4A and 4B the 2D comb-array 402 has multiple photosensitive elements 404 arranged or grouped into cells 406, each cell having photosensitive elements grouped in a 4×4 elements-per-cell (or 4×4 elements/period) configuration. Photosensitive elements 404 within a cell 406 with the same letter and same number, as shown in the detail of FIG. 5B, as well as corresponding elements of all cells in the 2D comb-array 402 with the same number, are electrically connected or wired-sum to yield eight signals A1 through D2. The eight wired-sum signals are further combined with differential amplifiers 408 to provide four signals containing the in-phase and quadrature information in the x and y directions.

Although the detector or photosensitive elements shown in FIGS. 4A and 4B are shown as being equal in size and square, it will be understood that is a particular embodiment of a 2D array which is not necessary to practice the invention. The 2D array may be either a periodic, 2D comb-array, which includes a number of regularly spaced photosensitive elements having 1D or 2D periodicity, a quasi-periodic 2D array (such as one having Penrose tiling), or a non-periodic 2D array, which has a regular pattern but doesn't include periodicities.

Molded Optic System

A MOS and a method of using the same in an optical navigation system according to the present invention will now be described in detail with reference to FIGS. 5 through 8.

Figure 5:
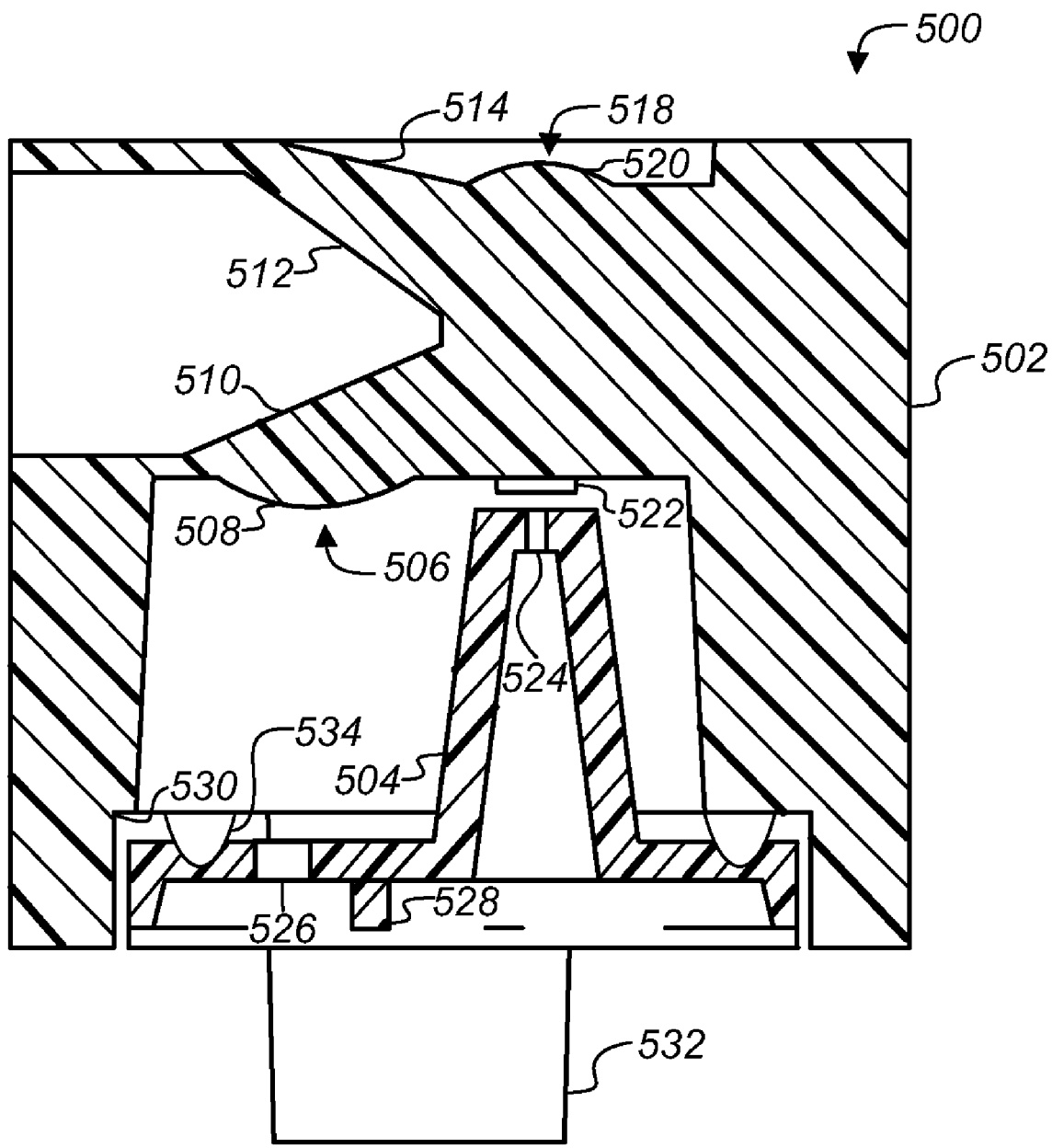
FIG. 5 is cross-sectional side view of a Molded Optic System (MOS) having a Molded Optic Component (MOC) and a Molded Aperture Component (MAC) according to an embodiment of the present invention.
Figure 6:
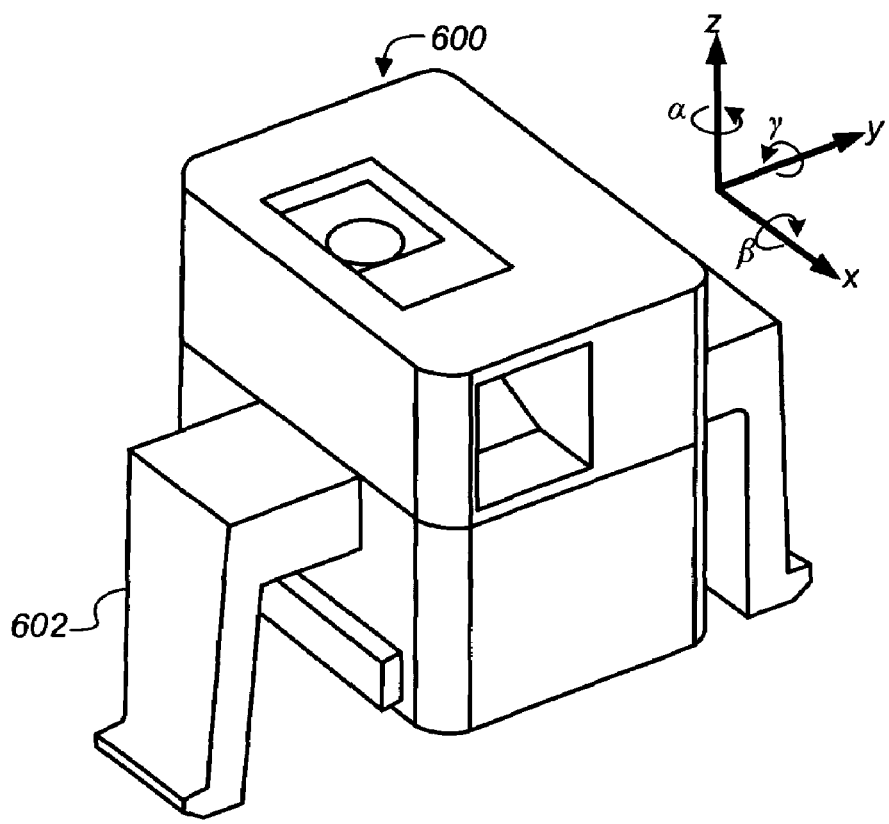
FIG. 6 is perspective view of the MOS of FIG. 5.

FIG. 5 is cross-sectional side view of a MOS 500 having a MOC 502 and a MAC 504 according to an embodiment of the present invention. A perspective view of the MOS 600 is shown in FIG. 6. Referring to FIG. 5, the MOC 502 is molded from a material, such as glass or plastic, which is substantially transparent to a wavelength or wavelengths of light used by the optical navigation system, and includes an illumination lens 506 having an illumination lens surface 508 to project a collimated beam of light from a light source (not shown in this figure) and a number of prism surfaces 510, 512 and 514 to redirect the collimated beam onto a surface relative to which motion is to be sensed to illuminate a portion of the surface. Preferably, the light from the light source is collimated by the illumination lens surface 508, and then redirected and circularized by the prism surfaces 510, 512 and 514, onto a Scatter Plane (SP) (not shown in this figure) location on the surface having a circular beam footprint.

The MOC 502 further includes an imaging lens 518 having two imaging lens surfaces 520, 522, to image light from the SP to an array of photosensitive elements (not shown in this figure), such as a photo diode array (PDA). Preferably, the imaging lens 518 magnifies or scales the light from the SP to substantially fill and fit the PDA, thereby increasing signal strength and optical efficiency of the optical navigation system. More preferably, the imaging optics of the MOC are telecentric in object space from the SP to the lens. In other words, the chief rays of the reflected light at each point on the SP are parallel, and preferably normal to the SP surface.

In certain alternative embodiments, the MOC 502 can be molded from a material that is substantially non-transparent to wavelengths of light other than those used by the optical navigation system, and serves to filter background light, such as environmental or ambient light in the visible spectrum, thereby improving a signal quality of reflected light.

In the embodiment shown, MOS 500 further includes a MAC 504 to provide matching between the speckle size and the sensor array period through control of θ 310 in FIG. 3. Generally, the MAC 504 has a light baffle molded from a substantially opaque material, such as a black opaque plastic, with a precision aperture 524 therein. The MAC 504 further includes an opening 526 or a substantially transparent portion to enable transmission of light emanating from the light source through the light baffle to the illumination lens 506. Preferably, the precision aperture 524 is located between the second lens surface 522 of the imaging lens 518 and the array of photosensitive elements in the path of light reflected from the portion of the illuminated surface to the array of photosensitive elements. More preferably, the precision aperture 524 is located at the focal point of the imaging lens 518, thus configuring the imaging lens for telecentric imaging of the SP in object space. Further the MAC 504 includes a wall structure 528 between the light source or VSCEL and the array or PDA to substantially blocks internal leakage of stray light from going directly from the VCSEL to the PDA.

Figure 7:
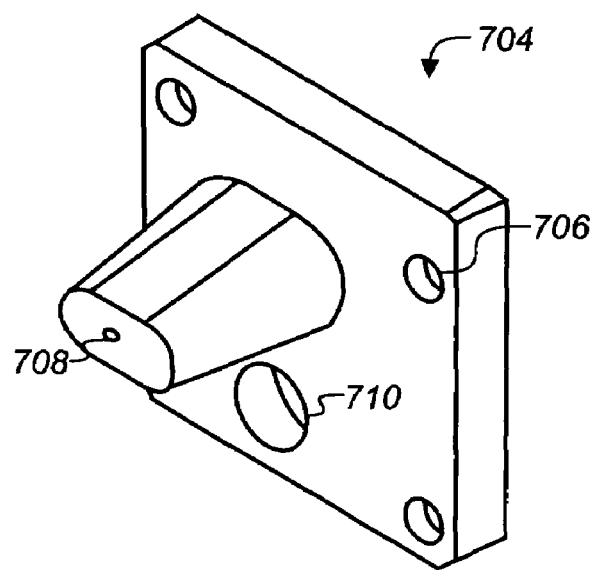
FIG. 7 is perspective view of a MAC of according to an embodiment of the present invention.

A perspective view of the MAC 704 of FIG. 5 is shown in FIG. 7. Referring to FIGS. 5 and 7, it is noted that the MOC 502 and the MAC 504 include a number of alignment features, such as a recessed shoulder 530 in the MOC, and a number of alignment holes 706 or indentations in the light baffle, which correspond to or mate with protrusions 534 in the MOC and facilitate the precise alignment of the precision aperture 524, 708 to the imaging lens 518, and the opening 526, 710 with the illumination lens 506.

Figure 8:
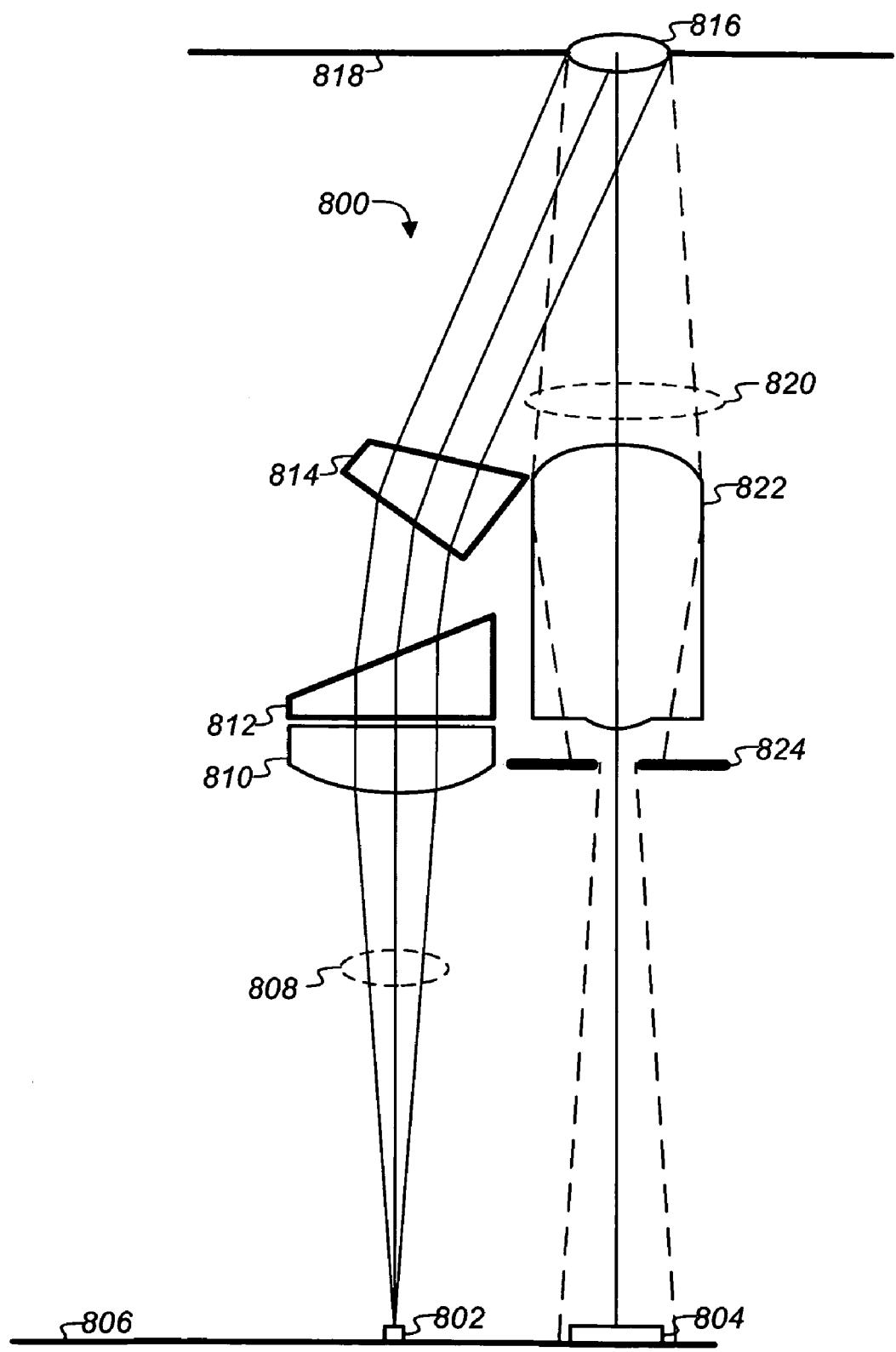
FIG. 8 is an optics diagram of an optical navigation system having a MOS according to an embodiment of the present invention.

An optics diagram of an optical navigation system having a MOS according to an embodiment of the present invention, and showing illumination and imaging optics is shown in FIG. 8. Referring to FIG. 8, the optical navigation system 800 generally includes a light source 802, such as a VCSEL, and an array 804 of photosensitive elements (not shown in this figure), such as a PDA, co-located on a surface of a single or substrate 806. More preferably, the VCSEL 802 and the PDA 804 are co-located on a common surface of an integrated circuit (IC) package (not shown in this figure).

Light 808 from the light source 802 is collimated by the illumination lens 810 then redirected and circularized by prisms 812, 814, onto a SP location 816 on a surface 818 relative to which motion of the optical navigation system 800 is to be detected.

A pattern in or created by light 820 reflected from the SP location 816 is imaged or mapped by an imaging lens 822 to the array 804. Preferably, the imaging lens 822 is adapted to magnify or scale the light from the SP location 816 to substantially fill and fit the array 804. More preferably, the precision aperture 824 is located at the focal point of the imaging lens 822, so that the imaging optics of the MOC are telecentric in object space as shown.

In certain preferred embodiments, the optical navigation system 800 is a speckle based system having a narrow band light or coherent source 802, and a precision aperture 824 sized and located relative to the image plane (imaging array) to set the Numerical Aperture (NA) for the system to establish or produce a predetermined average speckle size. Generally, the predetermined average speckle size is selected in relation to the size of individual photosensitive elements or PDs in the array 804 to optimize performance of the optical navigation system 800. Preferably, the individual photosensitive elements and the precision aperture 824 are sized and the precision aperture located such spatial frequencies of light-dark speckle pattern matches dimensions of interlaced groups of photosensitive elements.

The MOS incorporates several unique mechanical features, including mechanical alignment features that fully constrain the optics in correct alignment in all six degrees of freedom), and provide for self-alignment of the MOS to the VCSEL and PDA during assembly of the MOS to an IC package or PCB to which the VCSEL and PDA are mounted. The mechanical alignment features can include a pair of integral precision alignment pins that control lateral alignment of X and Y position and alpha (azimuthal) rotation of the MOS relative to the VCSEL and PDA, and/or a pair of integral, precision alignment pads (that control Z position (focus) and Beta and Gamma rotations.

Additionally, in certain embodiments the MOS further incorporates self locking retention features, such as integral clasps 532, 602, shown in FIGS. 5 and 6 respectively, which flex as the MOC engages the PCB and then snap back as the clasps penetrate through receiving holes in the PCB to lock the MOS securely in place and insure it is correctly located and seated relative to the IC Package.

The advantages of the molded optic system of the present invention over previous or conventional imaging and illumination optics include: (i) a stable monolithic structure containing multiple optical components; (ii) a compact form factor configured to minimize the overall component size and facilitate a compact design; (iii) a precision aperture that provides speckle matching to the sensor array; (iv) telecentric imaging to generate stable speckle pattern that translates uniformly as the SP moves with minimum speckle "boiling"; (v) integral alignment features that provide for self-alignment and registration to IC Package components during assembly of the optical navigation system; and (vi) a self-locking retention mechanism that provide for secure and stable mounting of the MOC to the IC Package and/or a PCB during assembly.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical navigation system comprising:
   a narrow spectral band light source to produce speckle in light reflected from a surface;
   an array of photosensitive elements;
   an optic system comprising:
   a unitary optic component including an illumination lens and at least one prism surface to project a collimated beam of light from the light source onto the surface and an imaging lens to image a portion of the illuminated surface to the array of photosensitive elements; and
   an aperture component that self-aligns with the unitary optic component during assembly of the optic system, the aperture component including an aperture sized and located between the imaging lens and the array of photosensitive elements to produce a predetermined average speckle size, the aperture is located at the focal point of the imaging lens to provide telecentric imaging that is telecentric in object space; and
   signal processing circuitry to combine signals from the array of photosensitive elements to generate a signal providing information on displacement of the optical navigation system relative to the surface.

2. A system according to claim 1, wherein the illumination lens collimates light from the light source.

3. A system according to claim 2, wherein the prism redirects the collimated beam of light from a first direction in which it is emitted from the light source to a second direction to illuminate the surface.

4. A system according to claim 3, wherein the prism circularizes the redirected beam of light to form a beam of light illuminating a circular area on the surface.

5. A system according to claim 1, wherein the imaging lens magnification matches the resolution for the imaged portion of the illuminated surface to the period of the array of photosensitive elements to meet data sampling requirements.

6. A system according to claim 1, wherein the aperture component comprises a number indentations and the unitary optic component further comprises a number of protrusions to self-align the aperture to the imaging lens during assembly of the optic system.

7. A system according to claim 1, wherein the aperture sets a system numerical aperture (NA) in image space to establish a predetermined average speckle size in the complex interference pattern.

8. A system according to claim 1, wherein the light source and the array of photosensitive elements are co-located on the same plane of an integrated circuit (IC) package, and wherein the unitary optic component further comprises a number of alignment features to self-align to the IC package during assembly optic system.

9. An optical navigation system according to claim 1, wherein the light source and the array of photosensitive elements are co-located on the same plane of an integrated circuit (IC) package.

10. An optical navigation system according to claim 9, wherein the unitary optic component further comprises a number of alignment features to self-align the optic system to the IC package during assembly optical navigation system.

* * * * *